Patented Apr. 18, 1939

2,154,969

UNITED STATES PATENT OFFICE 2,154,969

RESINOUS COMPOSITIONS

Howard L. Bender, Bloomfield, N. J., assignor to Bakelite Corporation, New York, N. Y., a corporation of Delaware No Drawing. Application March 13, 1936, Serial No. 68,779

15 Claims. (Cl. 260—18)

This invention relates to the production of resinous compositions, particularly resinous compositions comprising a phenolic resin and an oleaginous modifying agent.

It is known that phenols may be reacted with unsaturated oils, such as tung oil, in the presence of a converting agent. The so-called "converted oil" thus produced may then be transformed to an infusible, insoluble material by reaction with an appropriate methylene-containing body. The character of the infusible end product consisting of mixtures of phenol-formaldehyde resins with oil-phenol-formaldehyde compounds will vary from a material which is hard and substantially non-plastic to one which is highly flexible, depending on the proportions of oil which are employed in the preparation of the initial phenol-oil composition. A small proportion of combined oil, while acting as a plasticizer for the phenolic condensation product in the fusible soluble stage, has relatively little effect as regards plasticizing the material after it has been transformed to the infusible condition. Large proportions of combined oil, however, plasticize the final product so that it is highly flexible.

The usual converting agents employed to bring about a combination of oil and phenolic body have been compounds such as aluminum chloride, sulfur chloride, phosphoric, sulfuric, oxalic and other acids; or, in general, compounds of a more or less acidic character. The quantities employed are preferably so small that it will be unnecessary to remove them by washing.

As is well known, these acidic converting agents, in addition to acting as converting agents to produce the phenol-oil composition, also act as catalysts for the phenol aldehyde condensation, the resulting product being of the Novolak or so-called permanently fusible and soluble type. Consequently, if converting agents of this character are employed it is necessary to carry out the process of producing infusible, insoluble phenol-oil-methylene compositions in two steps, the first step involving the preparation of a condensation product of the Novolak or so-called permanently fusible and soluble type containing an organic addition agent, for example, a drying oil; this Novolak being in the second or final stage of the process converted in the presence of basic catalysts by formaldehyde, paraform, hexamethylene tetramine, or other appropriate methylene-containing body into the desired infusible product.

The use of alkaline catalysts for the condensation of phenol and formaldehyde directs the chemical action in a continuous series of reactions toward the formation of a finally infusible and insoluble end product. Due to the marked saponifying action of alkalies on oils, it has been considered to be impossible to use converting agents of an alkaline character to prepare the phenol-oil composition and then subsequently add a sufficient quantity of a methylene-containing body to convert it directly to the infusible insoluble end product.

It has now been discovered, however, that by a suitable choice of alkaline converting agents, phenol-oil compositions may be prepared which are capable of being converted directly to the insoluble infusible state without the necessity of first preparing a condensation product of the Novolak type and then converting it to the insoluble infusible state.

The properties and characteristics of the composition prepared with alkaline converting agents are in many respects quite different from those obtained with acid converting agents, these differences being totally unexpected and novel. For example, when acid converting agents are used, it is a general rule that the greater the proportion of reacted oil the greater is the flexibility of the final end product. By the use of alkaline converting agents, however, it is possible to prepare not only flexible products containing a large proportion of oil, but also brittle products; in other words, the character of the final product depends not so much on the proportion of oil to phenolic body, but rather on the nature of the alkaline catalyst. Products thus obtained are also characterized by their high heat stability, non-penetrating property, and high mechanical and chemical resistance.

The new alkaline catalyzed phenol-oil compositions may be made by reacting a phenolic compound, such as phenol, cresol, or higher substituted phenols with an unsaturated vegetable oil, such as tung oil or linseed oil, in the presence of a suitable alkaline converting agent. Strong alkalies, such as the oxides of sodium, potassium and calcium, have proved unsatisfactory because of their saponifying effect on the oil. The oxides of such metals as magnesium, zinc, lead, cadmium, and, in general, basic oxides of non-alkali forming metals, have been found to be suitable. In addition, salts of relatively strong bases and weak acids, such as sodium acetate, sodium borate, zinc stearate and the like, which have a weakly alkaline reaction, are effective in the reaction. In general, basic compounds which do not saponify oils to a substantial degree under the conditions of the reaction are suitable converting agents, including basic compounds having a lower alkalinity than the alkaline earth metal oxides or hydroxides.

The proportions of oil and phenolic constituent will depend on the particular results sought. These results, it must be remembered, are determined not only by the amount of oil used, but also by the nature of the catalyst; for example, a flexible product containing a high proportion of oil may be prepared by using a catalyst of the nature of zinc oxide, whereas the same proportion of oil may be maintained but a brittle product produced, if a catalyst such as magnesium oxide is used. Thus by proper choice of the oil-phenol ratio and of catalyst, compositions may be prepared which are either brittle or flexible and contain greater or lesser amounts of combined oil.

Flexible products containing a relatively high proportion of an unsaturated oil may be made, for example, as follows:

A mixture of phenol 100 parts, tung oil 300 parts, and zinc oxide 10 parts is heated for 10 hours at 180° C. The viscosity of the mixture at the end of this time is about 60 C. P. and will be increased with longer heating. The same results may be obtained by longer heating at lower temperatures. The product is liquid at ordinary and higher temperatures, more or less viscous according to reacting conditions, light brown in color, transparent in thin layers, and possesses a characteristic odor which does not resemble tung oil. Some free phenol may be present, but when completely reacted there is no substantial quantity of free tung oil either polymerized or unpolymerized. The free phenol may be removed as by distillation or may be left to form resin in the next step. To this phenol-oil composition are now added 25 parts of hexamethylene tetramine or equivalent methylene-yielding compound and the whole heated rapidly with stirring until evolution of ammonia or other vapors almost ceases. The resulting product is a soft plastic compound at room temperatures. At above zero centigrade it is a soft rubbery solid which resembles a soft crepe rubber except not so elastic. At 100° C. it is a heavy liquid. When held hot, for instance at 100° C., it hardens until it is a rubbery solid at higher temperatures.

The preparation of a brittle product containing a relatively high proportion of oil may be effected, for example, as follows:

Phenol 100 parts, tung oil 300 parts, and magnesium oxide 10 parts, are reacted 10 hours at 180° C. The resulting product is a liquid with a viscosity of about 50 C. P. Very long heating at this stage will cause the mass to become a somewhat rubbery solid containing some free phenol.

The product at any stage, but preferably as a liquid, is reacted with approximately 1 mole of a methylene-containing compound, for example, hexamethylene tetramine, paraformaldehyde, formaldehyde, acetaldehyde, furfuraldehyde, crotonaldehyde, benzaldehyde and the like. The products differ somewhat in properties with the different methylene compounds, but are all more resinous than the gelled oil-phenol compound and when completely reacted are not rubbery in character.

The above 50 C. P. liquid phenol-oil compound, reacted with 30 grams paraformaldehyde, i. e. 1 mole methylene equivalent, for 1 hour at 125-130° C., or until a cooled sample was a resinous solid having the odor of formaldehyde, was found useful for blending with fibrous materials as a bonding agent to make molding materials. Mixed with equal weight of solvent, for instance, toluene, it produces a baking type resinous coating compound suitable for protecting metallic surfaces or cellulosic bases, or for use as an adhesive, for example, to attach sand or grit to paper.

A plastic reactive product with properties somewhat between those of the foregoing examples may be made, for example, as follows:

Cresol (technical mixture) 100 parts, linseed oil 100 parts, and lead acetate 15 parts, are reacted 24 hours at about 170° C. under about 10 inches of vacuum applied to the system to facilitate removal of water vapor. To the resulting liquid 80 parts of 37½% formaldehyde are added and the mass is refluxed for about 3 hours.

At this point a little additional basic catalyst as $Na_2CO_3$, hexamethylene tetramine, or ethylene diamine is desirable to shorten the reaction time and give a somewhat more rapidly hardening final product.

The resulting resin either with or without additional catalyst is dehydrated to a plastic semi-hard mass which may be further reacted by heat to an infusible final product of value as a bond in sand cores for molding or as a bond and friction agent in brake linings.

In the above example other weak alkaline salts as sodium acetate, sodium tetraborate, zinc stearate and the like may be used to replace the lead acetate.

I claim:

1. A method of making a phenol-oil composition which comprises heating a phenol at a temperature of at least 170° C. with an unsaturated fatty oil in the presence of a weakly alkaline compound less alkaline than the alkaline earth metal oxides.

2. A method of making a phenol-oil composition which comprises heating a phenol at a temperature of at least 170° C. with an unsaturated fatty oil in the presence of a weakly alkaline metal oxide less alkaline than the alkaline earth metal oxides.

3. A method of making a phenol-oil composition which comprises heating a phenol at a temperature of at least 170° C. with an unsaturated fatty oil in the presence of a weakly alkaline salt less alkaline than the alkaline earth metal oxides.

4. A method of making a resinous composition which comprises heating a phenol at a temperature of at least 170° C. with an unsaturated fatty oil in the presence of a weakly alkaline compound less alkaline than the alkaline earth metal oxides and thereafter heating the product in the presence of a methylene-containing compound.

5. A method of making a resinous composition which comprises heating a phenol at a temperature of at least 170° C. with an unsaturated fatty oil in the presence of a weakly alkaline salt less alkaline than the alkaline earth metal oxides and thereafter heating the product in the presence of a methylene-containing compound.

6. The reaction product of a phenol, an unsaturated fatty oil and a weakly alkaline compound less alkaline than the alkaline earth metal oxides reacted at a temperature of at least 170° C.

7. The reaction product of a phenol, tung oil and a weakly alkaline compound less alkaline than the alkaline earth metal oxides reacted at a temperature of at least 170° C.

8. The reaction product of a phenol, an unsaturated fatty oil and a weakly alkaline salt less alkaline than the alkaline earth metal oxides reacted at a temperature of at least 170° C.

9. The reaction product of a phenol, an unsaturated fatty oil and a weakly alkaline metal oxide less alkaline than the alkaline earth metal oxides reacted at a temperature of at least 170° C.

10. A method of making a phenol-oil composition which comprises heating a phenol at a temperature of at least 170° C. with an unsaturated fatty oil in the presence of a basic compound which does not saponify fatty oils to a substantial degree under the conditions of the reaction selected from the group consisting of weakly alkaline metallic oxides and salts of relatively strong bases and weak acids.

11. A method of making resinous compositions which comprises heating a phenol at a temperature of at least 170° C. with an unsaturated fatty oil in the presence of a basic compound which does not saponify fatty oils to a substantial degree under the conditions of the reaction selected from the group consisting of weakly alkaline metallic oxides and salts of relatively strong bases and weak acids and thereafter heating the product in the presence of a methylene-containing compound.

12. A method of making a phenol-oil composition which comprises heating a phenol at a temperature of at least 170° C. with an unsaturated fatty oil in the presence of magnesium oxide.

13. A method of making a phenol-oil composition which comprises heating a phenol at a temperature of at least 170° C. with an unsaturated fatty oil in the presence of zinc oxide.

14. The reaction product of a phenol, an unsaturated fatty oil and magnesium oxide reacted at a temperature of at least 170° C.

15. The reaction product of a phenol, an unsaturated fatty oil and zinc oxide reacted at a temperature of at least 170° C.

HOWARD L. BENDER.